(12) United States Patent
Kawatoko

(10) Patent No.: US 7,196,510 B2
(45) Date of Patent: Mar. 27, 2007

(54) INDUCTION TYPE DISPLACEMENT DETECTOR

(75) Inventor: Osamu Kawatoko, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/248,513

(22) Filed: Oct. 12, 2005

(65) Prior Publication Data

US 2006/0076949 A1    Apr. 13, 2006

(30) Foreign Application Priority Data

Oct. 12, 2004    (JP)    ............................. 2004-297688

(51) Int. Cl.
*G01B 7/14*    (2006.01)
*G01B 7/02*    (2006.01)
*G01D 5/20*    (2006.01)

(52) U.S. Cl. .............................. 324/207.17; 324/207.24

(58) Field of Classification Search .......... 324/207.17, 324/207.22, 207.25, 207.24; 336/30, 45; 340/870.31–870.32
See application file for complete search history.

(56) References Cited

U.S. PATENT DOCUMENTS 4,697,144 A * 9/1987 Howbrook ............. 324/207.17
5,574,381 A   11/1996 Andermo et al.
5,886,519 A * 3/1999 Masreliez et al. ...... 324/207.17
6,002,250 A * 12/1999 Masreliez et al. ...... 324/207.16
6,011,389 A   1/2000 Masreliez et al.
6,124,708 A * 9/2000 Dames .................. 324/207.12

FOREIGN PATENT DOCUMENTS

DE    3642607    6/1988
EP    0 743 508 A2    11/1996
JP    08-313295    11/1996

* cited by examiner

*Primary Examiner*—Jay M. Patidar
(74) *Attorney, Agent, or Firm*—Rankin, Hill, Porter & Clark LLP

(57) ABSTRACT

The invention provides an induction type displacement detector capable of achieving an improved resolution and high precision. The induction type displacement detector comprises a scale, and a sensor head movable along a measurement axis. A plurality of flux coupling windings are arranged on the scale along the measurement axis. A receiving winding is arranged on the sensor head, including receiving loops arrayed along the measurement axis.

9 Claims, 14 Drawing Sheets

INDUCTION TYPE DISPLACEMENT DETECTOR

CROSS-REFERENCE TO RELATED APPLICATION

This application is based on and claims the benefit of priority from prior Japanese Patent Application No. 2004-297688, filed on Oct. 12, 2004, the entire contents of which are incorporated herein by reference.

BACKGROUND OF THE INVENTION

1. Field of the Invention

The present invention relates to an induction type displacement detector operative to detect a displacement using inductive coupling (flux coupling), which is applicable to a caliper and a linear encoder.

2. Description of the Related Art

An induction type displacement detector is employed in precise measurements of linear displacements and angular displacements. A conventional induction type displacement detector comprises a scale having plates arrayed as flux coupling members at a certain pitch, and a sensor head arranged relatively movable and opposite to the scale. The sensor head has a transmitting winding and a receiving winding arranged thereon, which are capable of flux coupling to the plates (see JP-A8-313296, FIG. 4, for example).

For the purpose of providing the induction type displacement detector with an improved resolution and high precision, it is simply required to reduce a pitch between the plates serving as flux coupling members and a dimension of a receiving loop contained in the receiving winding. As the plates have simple shapes, the pitch between the plates can be narrowed easily. The receiving winding has a relatively complicated shape, however, because plural receiving loops are linked along the direction of the relative movement of the sensor head. In addition, when output signals from the receiving winding are subjected to interpolation to improve the resolution, plural receiving windings are arranged on the sensor head, phase-shifted and overlapped. In this case, the shapes of the receiving windings become more complicated.

As the shape of the receiving winding is relatively complicated in this ways the receiving loop has a relatively large limited dimension on the design rule. The use of a thin-film multi-layered board or a high-density built-up board as a board for use in formation of the receiving winding thereon can reduce the limited dimension of the receiving loop while it elevates the production cost of the induction type displacement detector.

The present invention has an object to provide an induction type displacement detector capable of achieving an improved resolution and high precision.

SUMMARY OF THE INVENTION

In one aspect the present invention provides an induction type displacement detector, comprising: a scale; a sensor head arranged opposite to the scale and movable relative to the scale in a direction along a measurement axis; a transmitting member arranged on the sensor head; a receiving winding having; a plurality of receiving loops arrayed on the sensor head along the measurement axis; and a plurality of flux coupling members capable of flux coupling to the transmitting member and the receiving winding and arrayed on the scale along the measurement axis, wherein adjacent receiving loops configure a pair-loop having a length of $\lambda$ along the measurement axis, wherein each receiving loop has a length of $\lambda/2$ along the measurement axis, and the flux coupling members have a pitch of $\lambda/N$ (where N is an odd number of 3 or more).

In the induction type displacement detector according to one aspect of the present invention, adjacent receiving loops configure a pair-loop having a length of $\lambda$ while the flux coupling members have a pitch of $\lambda/N$ (where N is an odd number of 3 or more). Therefore, without suffering an influence from the limited dimension of the receiving loop on the design rule, the pitch between the flux coupling members can be reduced. Thus, the induction type displacement detector can be provided with an improved resolution and high precision. If N is an even number, a signal received at one receiving loop contained in the pair-loop and a signal received at the other receiving loop cancel each other and no output signal is provided from the receiving winding. Therefore, N is determined to an odd number.

In the induction type displacement detector according to one aspect of the present invention, the receiving winding may be one of three such receiving windings arranged with a phase difference of $\lambda/3$ or $\lambda/6$, and the flux coupling members may have a pitch of $\lambda/5$.

This is the so-called three-phase type. If the flux coupling members have a pitch of $\lambda/3$ in this type, the output signals from three receiving windings have the same phase. In this case, three output signals with different phases can not be provided and accordingly interpolation can not be executed. On the other hand, the smaller the pitch between the flux coupling members becomes, the lower the intensity of the output signal from each receiving winding becomes. Therefore, the flux coupling members may have a pitch of $\lambda/5$.

In the induction type displacement detector according to one aspect of the present invention, the receiving winding may be one of two or four such receiving windings, which are arranged with a phase difference of $\lambda/4$. The present invention in one-aspect is also applicable to the so-called two- or four-phase type.

In the induction type displacement detector according to one aspect of the present invention, the receiving loops each may have a central portion extending along the measurement axis, and two side portions extending at an angle to the measurement axis and located on both sides of the central portion. In this case, twice the length of the side portion along the measurement axis may be smaller than a pitch between the flux coupling members. This is effective to enhance the intensity of the output signal from the receiving winding.

In the induction type displacement detector according to one aspect of the present invention, a boundary between the central portion and the side portion may be formed smaller in tilt to the measurement axis than the side portion.

This is effective to increase the area of the receiving winding overlapping the flux coupling member (that is, the intensity of the output signal from the receiving winding) without interfering with the design rule on the receiving loop.

In another aspect the present invention provides an induction type displacement detector, comprising: a scale; a sensor head arranged opposite to the scale and movable relative to the scale along a measurement axis; a transmitting member arranged on the sensor head; a receiving winding having a plurality of receiving loops arrayed on the sensor head along the measurement axis such that a space is provided in between adjacent receiving loops; and a plurality of flux coupling members capable of flux coupling to the transmitting member and the receiving winding and arrayed on the scale along the measurement axis, wherein the receiving loops have a pitch of Q while the flux coupling members have a pitch of Q/N (where N is an integer of 2 or more).

In the induction type displacement detector according to another aspect of the present invention, the receiving loops have a pitch of Q while the flux coupling members have a pitch of Q/N (where N is an integer of 2 or more). Therefore, without suffering an influence from the limited dimension of the receiving loop on the design rule, the pitch between the flux coupling members can be reduced. Thus, the induction type displacement detector can be provided with an improved resolution and high precision. In the induction type displacement detector according to another aspect of the present invention a space of one receiving loop is provided in between adjacent receiving loops. Accordingly, N may be either even or odd.

Thus, the present invention can provide the induction type displacement detector with an improved resolution and high precision.

DETAILED DESCRIPTION OF THE INVENTION

Figure 1:
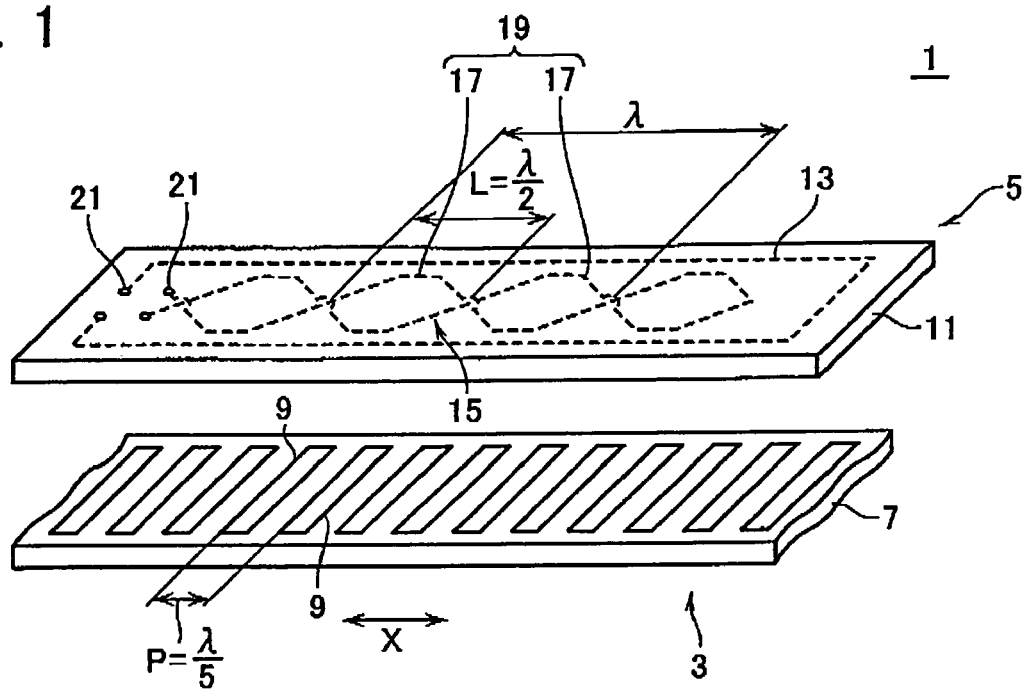
FIG. 1 is a perspective view showing a brief structure of an induction type displacement detector according to a first embodiment.

Embodiments of the present invention will now be described with reference to the drawings. In the figures illustrative of the embodiments, the same parts as those denoted with the reference numerals already described are given the same reference numerals and omitted from the following description.

[First Embodiment]

An induction type displacement detector according to a first embodiment is mainly characterized as follows. When adjacent receiving loops configure a pair-loop (also referred to as a twisted pair) having a length of $\lambda$ along a measurement axis, flux coupling windings (an example of flux coupling members) are determined to have a pitch of $\lambda/5$. The induction type displacement detector according to the first embodiment is described first about the structure thereof. FIG. 1 is a perspective view showing a brief structure of the device 1.

The induction type displacement detector 1 comprises a scale 3 and a sensor head 5 arranged opposite thereto. The scale 3 is partly depicted in the longitudinal direction thereof. The longitudinal direction of the scale 3 corresponds to a measurement axis X. The sensor head 5 is spaced from the scale 3 by a certain gap and arranged movable along the measurement axis X. The device may also be configured such that the sensor head is stationary while the scale is movable. In a word, it is sufficient if the sensor head and the sensor are relatively movable in a direction along the measurement axis.

The scale 3 includes an insulating board 7 composed of a glass epoxy resin. Alternatively, the board 7 may be composed of glass or silicon. On a surface of the board 7, opposite to the sensor head 5, a plurality of flux coupling windings 9 (an example of the flux coupling members) having the same shape are aligned along the measurement axis X. In other words, a plurality of flux coupling windings 9 are arrayed on the scale 3 along the measurement axis X.

A flux coupling winding 9 is a rectangular linear conductor of which longitudinal direction is perpendicular to the measurement axis X. The linear conductor is composed of a low-resistance material such as aluminum, copper and gold. A passivation film, not shown, is formed over the insulating board 7 to cover the flux coupling windings 9. Instead of the windings 9, metal plates capable of interfering with flux coupling may be arranged periodically along the measurement axis X. Also in this case, a periodic signal can be obtained from a receiving winding 15 depending on the location of the sensor head 5 and employed in displacement detection, like when the windings 9 are arranged.

The sensor head 5 includes an insulating board 11 composed of a glass epoxy resin. Alternatively, the board 11 may be composed of glass or silicon. On a surface of the board 11, opposite to the scale 3, a transmitting winding 13 (an example of the transmitting member) is formed. Therefore, the transmitting winding 13 is arranged on the sensor head 5. The transmitting winding 13 is shaped in a rectangle of which longitudinal direction is determined along the measurement axis X. The transmitting winding 13 is capable of flux coupling to the flux coupling windings 9. Instead of the transmitting winding 13, a single linear conductor may be employed as the transmitting member.

On the surface of the insulating board 11, opposite to the scale 3, a single receiving winding 15 is located inside the transmitting winding 13. The winding 15 is capable of flux coupling to the flux coupling windings 9. A plurality of receiving loops 17 aligned on the insulating board 11 along the measurement axis X configure the receiving winding 15. In other words the receiving winding 15 includes a plurality of receiving loops 17 arrayed on the sensor head 5 along the measurement axis X. The receiving winding 15 is not limited to one but two or more may be provided. For example, the present invention is also applicable to two receiving windings arranged with a phase difference of λ/4 or three receiving windings arranged with a phase difference of λ/6.

A receiving loop 17 is a hexagonal linear conductor. Adjacent receiving loops 17 are linked through a three-dimensional intersection to configure a pair-loop 19. The pair-loop 19 has a length of A along the measurement axis X. A single receiving loop 17 has a length L of λ/2 along the measurement axis X. The flux coupling windings 9 have a pitch P of λ/5.

A passivation film, not shown, is formed over the insulating board 11 to cover the transmitting winding 13 and the receiving winding 15. The transmitting winding 13 and the receiving winding 15 have terminals 21, which are connected via wires to an IC (not shown) operative to compute and control for displacement measurements. The transmitting winding 13 and the receiving winding 15 are composed of the same material as that of the flux coupling winding 9. The above description is directed to the configuration of the induction type displacement detector 1.

Figure 2:
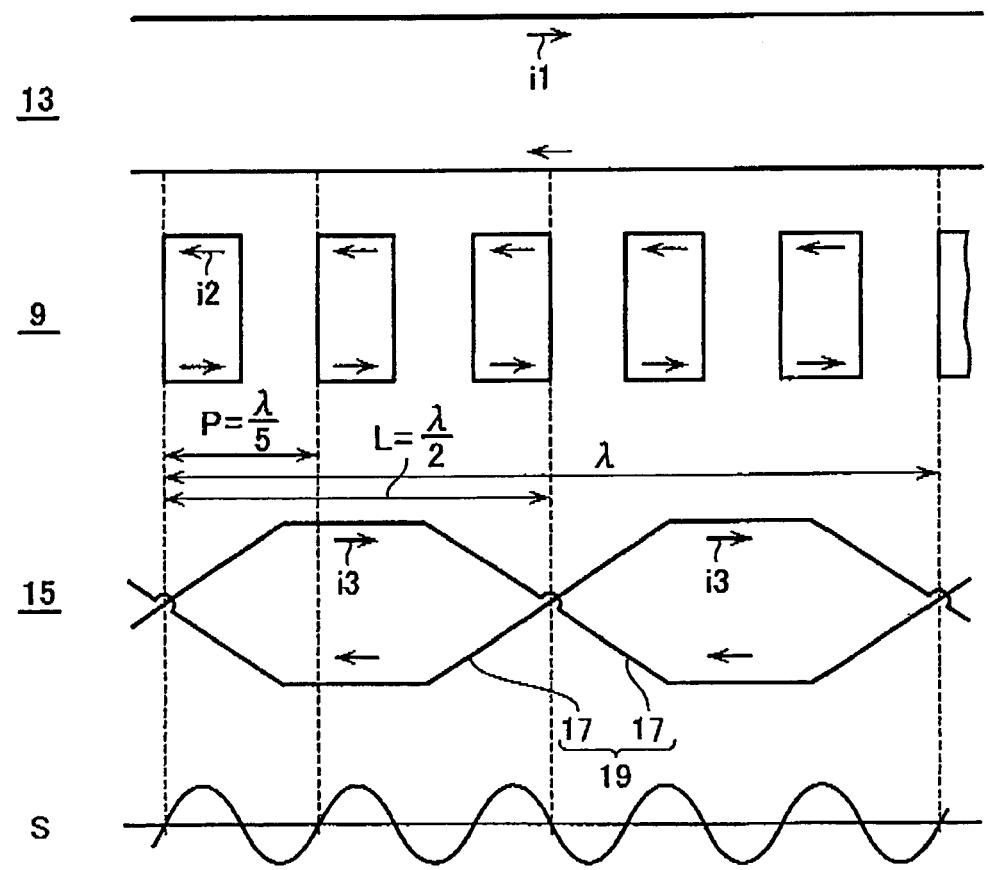
FIG. 2 is an illustrative view of operation of the induction type displacement detector according to the first embodiment.

FIG. 2 is employed next to briefly describe operation of the induction type displacement detector 1. FIG. 2 is an illustrative view of the operation. It shows plan views of the transmitting winding 13, the flux coupling winding 9 and the receiving winding 15 in part, and a waveform diagram of an output signal S provided from the receiving winding 15 as the sensor head moves relative to the scale.

A transmitting drive signal (single-phase AC) is sent to the transmitting winding 13 to feed a drive current i1 flowing in the transmitting winding 13 clockwise when a certain time is noted. By the drive current i1 the transmitting winding 13 generates an alternating magnetic flux to make a flux coupling to the flux coupling windings 9. As a result, an induced current i2 flows in the flux coupling windings 9 counterclockwise. By this induced current, the flux coupling winding 9 generates an alternative flux to make a flux coupling to the receiving loops 17 of the receiving winding 15. This coupling causes an induced current i3 to flow in the receiving loops 17 clockwise. As a result, a sinusoidal output signal S is sent to the IC, not shown, from the receiving winding 15 as the sensor head moves relative to the scale. The IC samples the output signal S and converts it into digital values to compute the location of the sensor head 5 relative to the scale 3.

Figure 3:
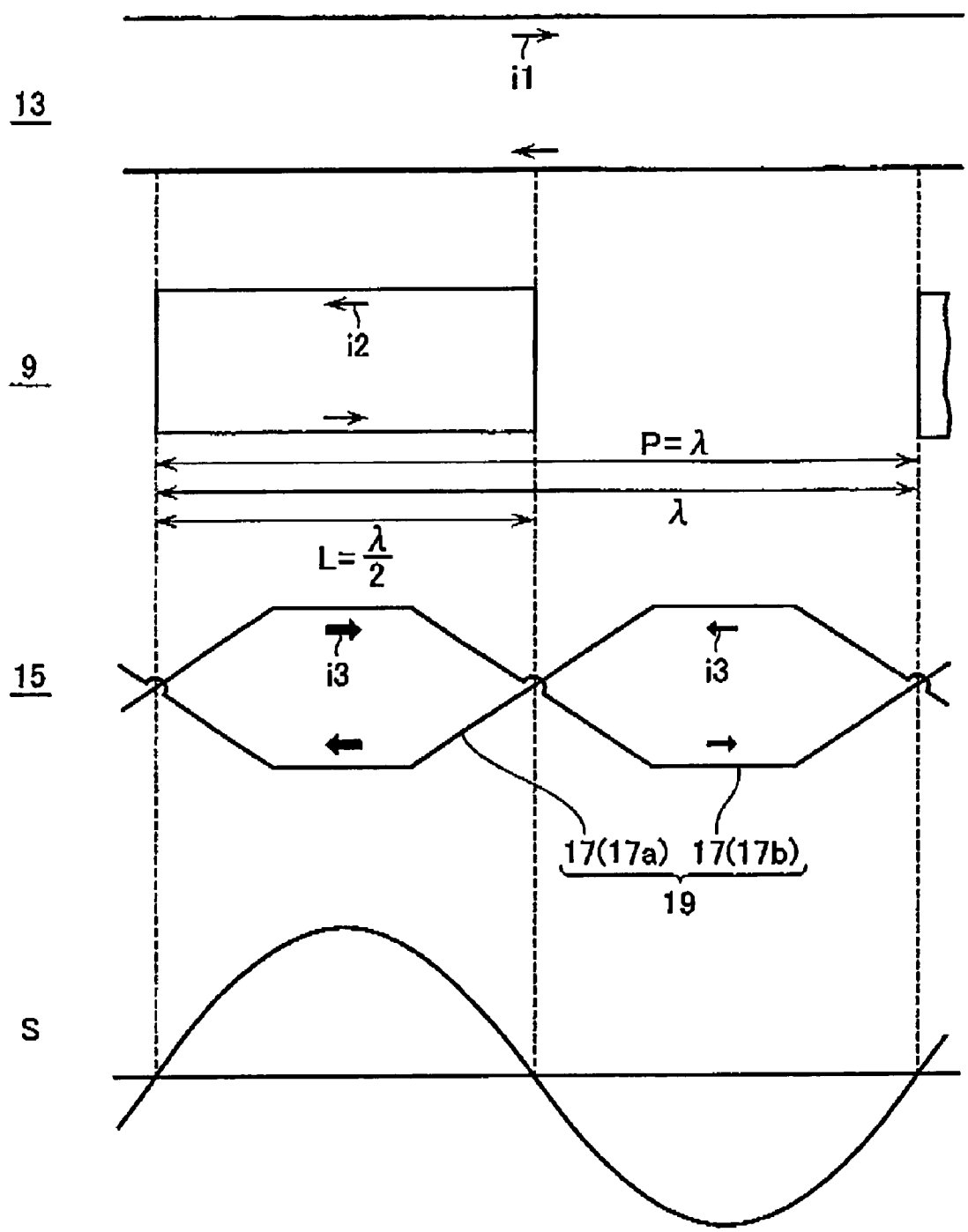
FIG. 3 is an illustrative view of operation of a comparative example to the first embodiment.

As described above, in the first embodiment the pair-loop 19 has a length of λ while the flux coupling windings 9 have a pitch of λ/5. On the contrary, in an induction type displacement detector according to a comparative example, the flux coupling windings 9 have a pitch P of λ. FIG. 3 is an illustrative view of operation of the comparative example, which corresponds to FIG. 2. In a positional relation between the flux coupling winding 9 and the receiving winding 15 shown in FIG. 3, a receiving loop 17 (17b) does not overlap the flux coupling winding 9. Accordingly, an induced voltage is caused on a receiving loop 17a and no induced voltage is caused on the receiving loop 17b. Thus, the induced current i3 flows in the direction of the shown arrow and a sinusoidal output signal S is sent to the IC, not shown, from the receiving winding 15 as the sensor head moves relative to the scale.

Figure 4:
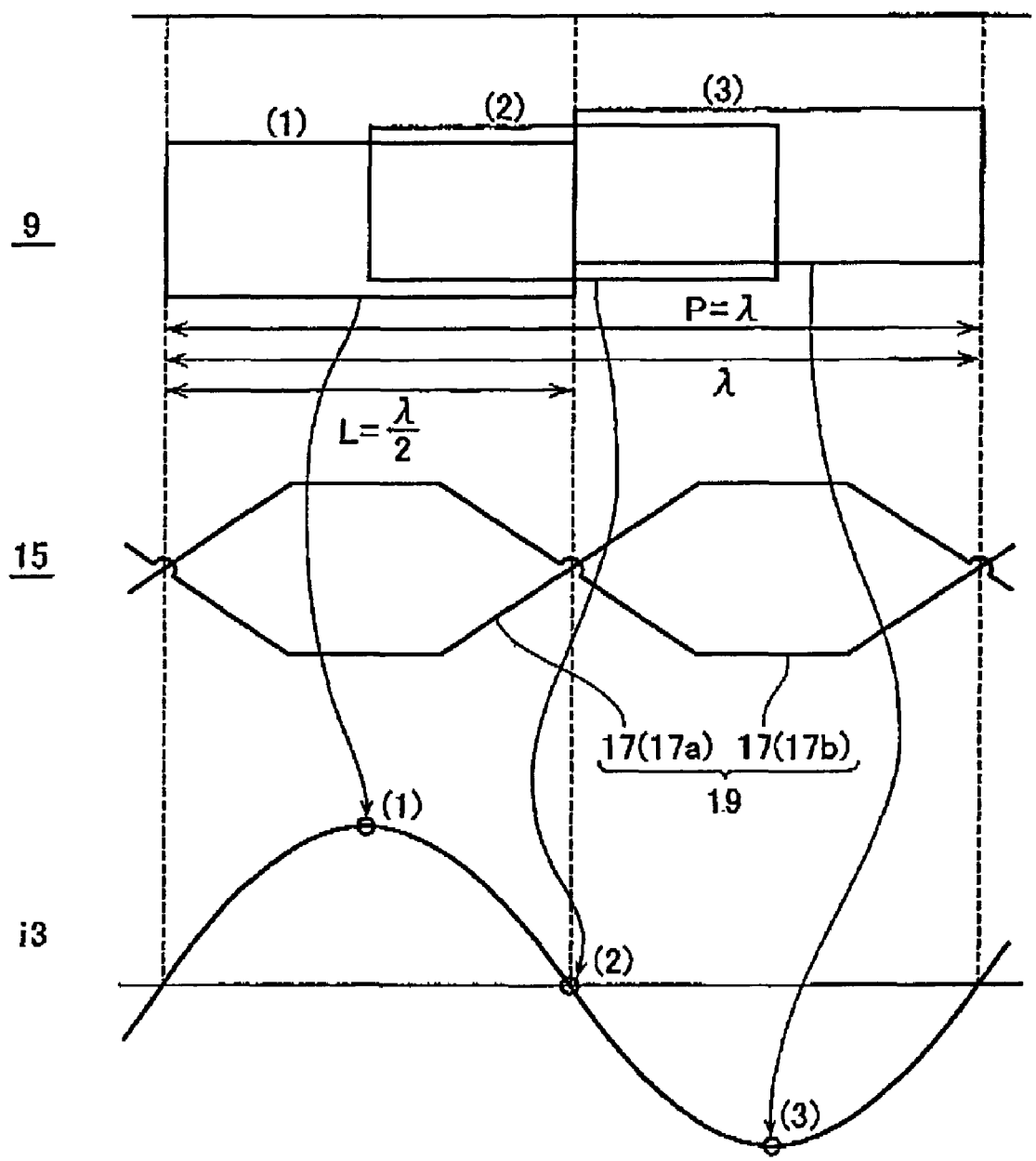
FIG. 4 is an illustrative view of a variation in induced current 13 in the comparative example shown in FIG. 3.

In accordance with the movement of the sensor head relative to the scale, the induced current i3 exhibits a variation, which is described with reference to FIG. 4 taking the comparative example shown in FIG. 3 as an example. When the flux coupling winding 9 most overlaps the receiving loop 17a as shown in (1), the induced current i3 flows as shown in FIG. 3 and reaches the positive maximum as shown in FIG. 4. When the flux coupling winding 9 overlaps the receiving loop 17a same as the flux coupling winding 9 overlaps the receiving loop 17b as shown in (2), the current i3 flowing in the receiving loop 17a matches with that in the receiving loop 17b. In this case, the current i3 is kept at zero. When the flux coupling winding 9 most overlaps the receiving loop 17b as shown in (3), the induced current i3 reaches the negative maximum.

In the comparative example the flux coupling windings 9 have a pitch P of λ and accordingly the output signal S has a wavelength of λ. On the contrary, in the first embodiment of FIG. 2 the flux coupling windings 9 have a pitch P of λ/5 and accordingly the output signal S has a wavelength of λ/5. Therefore, the wavelength of the output signal S in the first embodiment is ⅕ that of the comparative example. Thus, in the first embodiment the pitch P between the flux coupling windings 9 is made smaller to shorten the wavelength of the output signal S. According, it is possible to provide the induction type displacement detector with an improved resolution and high precision.

In the first embodiment the receiving loop 17 has a length L, which is same as that in the comparative example and equal to λ/2. Therefore, in the first embodiment the pitch P between the flux coupling windings 9 can be made smaller without reducing the dimension of the receiving loop 17. This means that the pitch P between the flux coupling windings 9 can be reduced without suffering an influence from the limited dimension of the receiving loop 17 on the design rule. Therefore, a relatively inexpensive board such as a glass epoxy board can be employed as the insulating board 11 of the sensor head 5 to lower the production cost of the induction type displacement detector.

Figure 5:
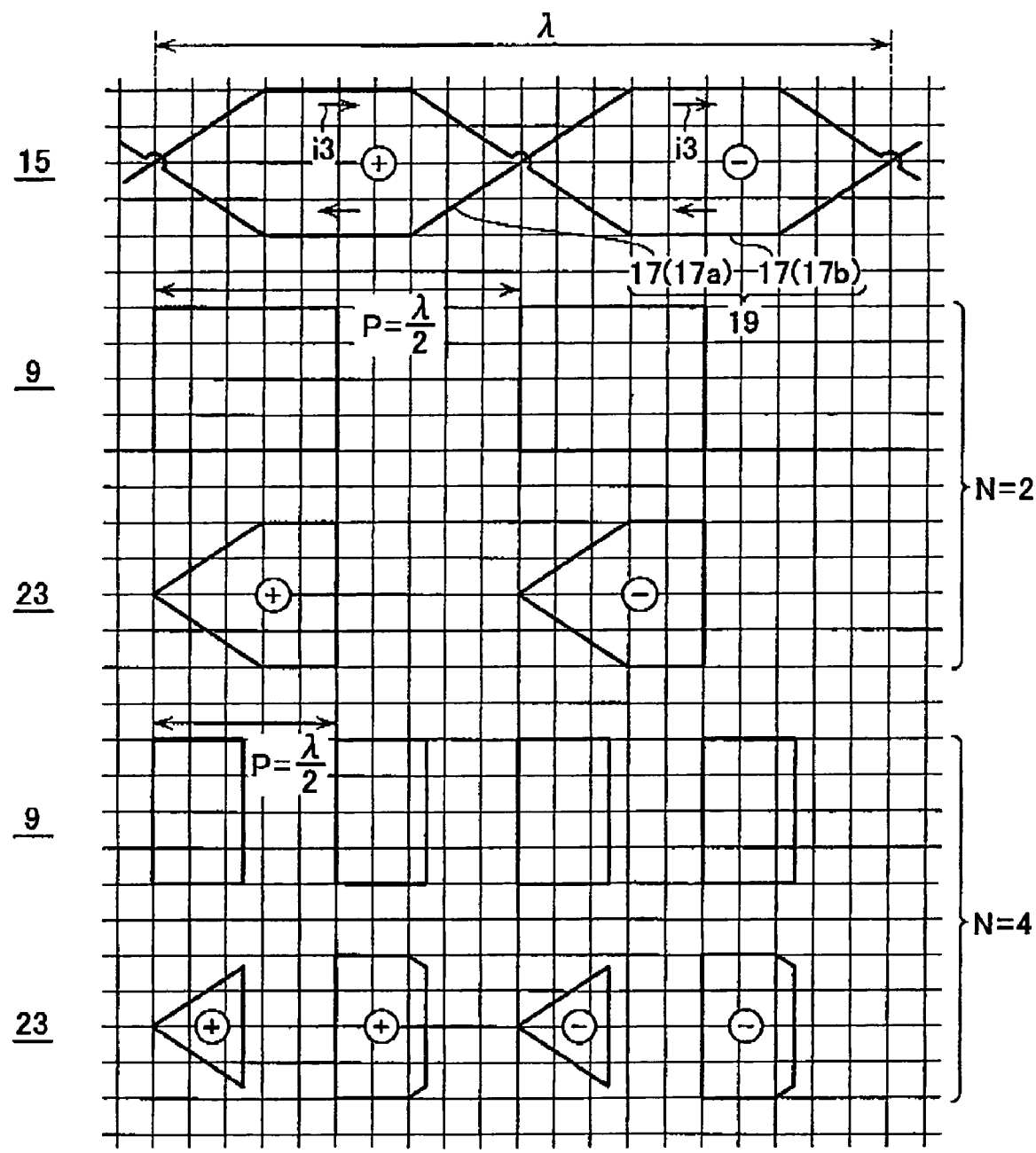
FIG. 5 shows flux coupling windings, a receiving winding and an overlapped portion therebetween according to another comparative example to the first embodiment.

In the first embodiment the pitch P between the flux coupling windings 9 is described as λ/5 though it may be λ/N (where N is an odd number of 3 or more). The following description is given to the reason why N is determined to an odd number of 3 or more. FIG. 5 shows the flux coupling windings 9, the receiving winding 15 and an overlapped portion 23 therebetween where N is equal to 2, 4. In this case, the induced current i3 flowing in one receiving loop 17 (17a) of the pair-loop 19 is given a "+" sign while the induced current i3 flowing in the other receiving loop 17 (17b) is given a "−" sign.

The overlapped portion 23 of the receiving loop 17a has the same area as that of the receiving loop 17b. Therefore, the induced current i3 flowing in the receiving loop 17a has the same intensity as that in the receiving loop 17b, resulting in cancellation of the induced current i3.

Figure 6:
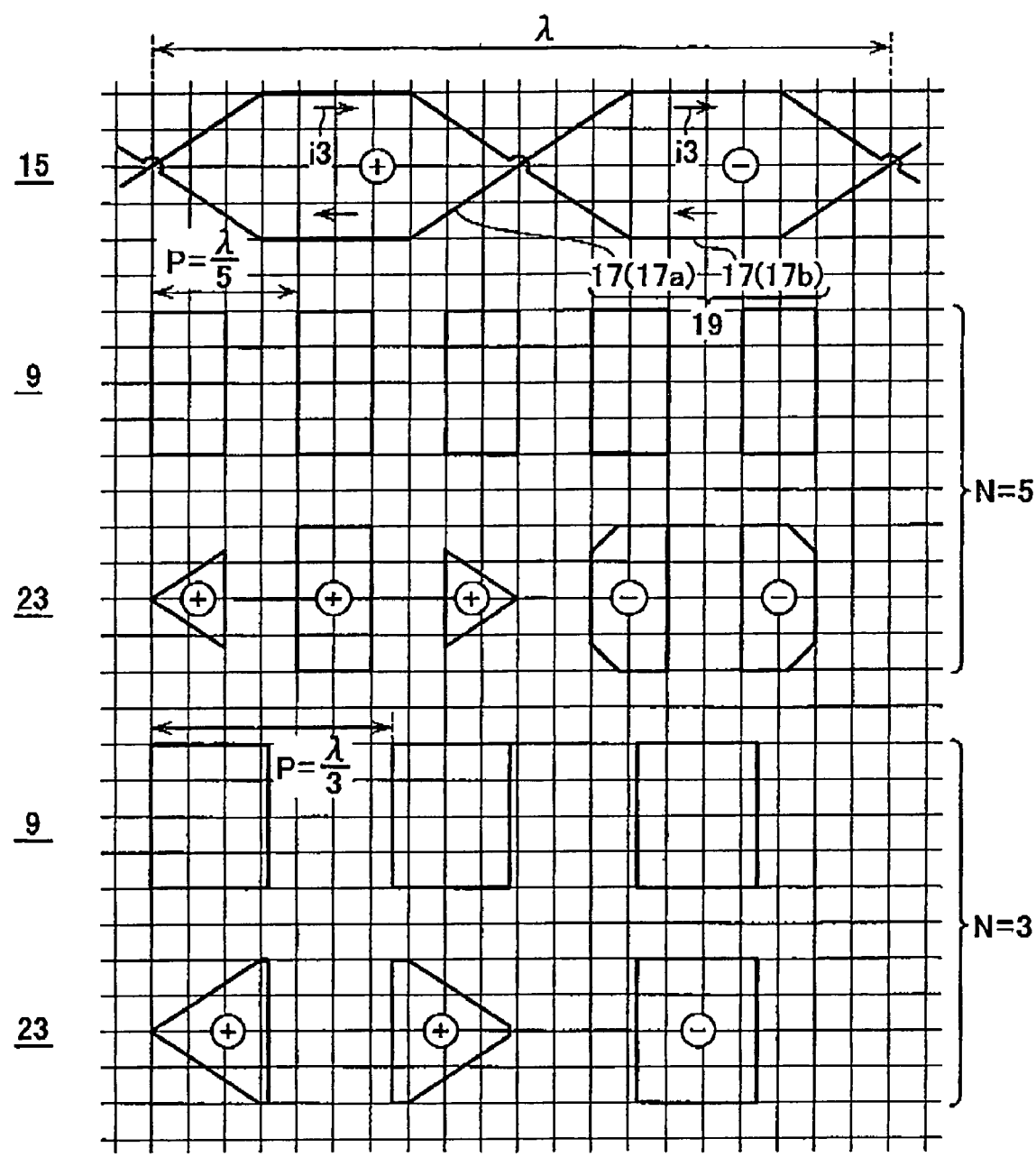
FIG. 6 shows flux coupling windings, a receiving winding and an overlapped portion therebetween according to the first embodiment.

On the other hand, FIG. 6 shows the flux coupling windings 9, the receiving winding 15 and an overlapped portion 23 therebetween, where N is equal to 3, 5, corresponding to FIG. 5. When N is an odd number, the receiving loop 17a is different in area of the overlapped portion 23 from the receiving loop 17b. For example, when N=5, the area of the "+" overlapped portion 23 is equal to about 13 squares while the area of the "−" overlapped portion 23 is equal to about 14 squares. Accordingly, the induced current i3 flowing in the receiving loop 17a can be made different in intensity from that in the receiving loop 17b to provide an output signal from the receiving winding 15.

As above, when N is equal to an even number, the signal received at the receiving loop 17a and the signal received at the receiving loop 17b cancel each other out. Accordingly, no output signal can be obtained from the receiving winding 15. Thus, N is determined to an odd number of 3 or more.

[Second Embodiment]

Figure 7:
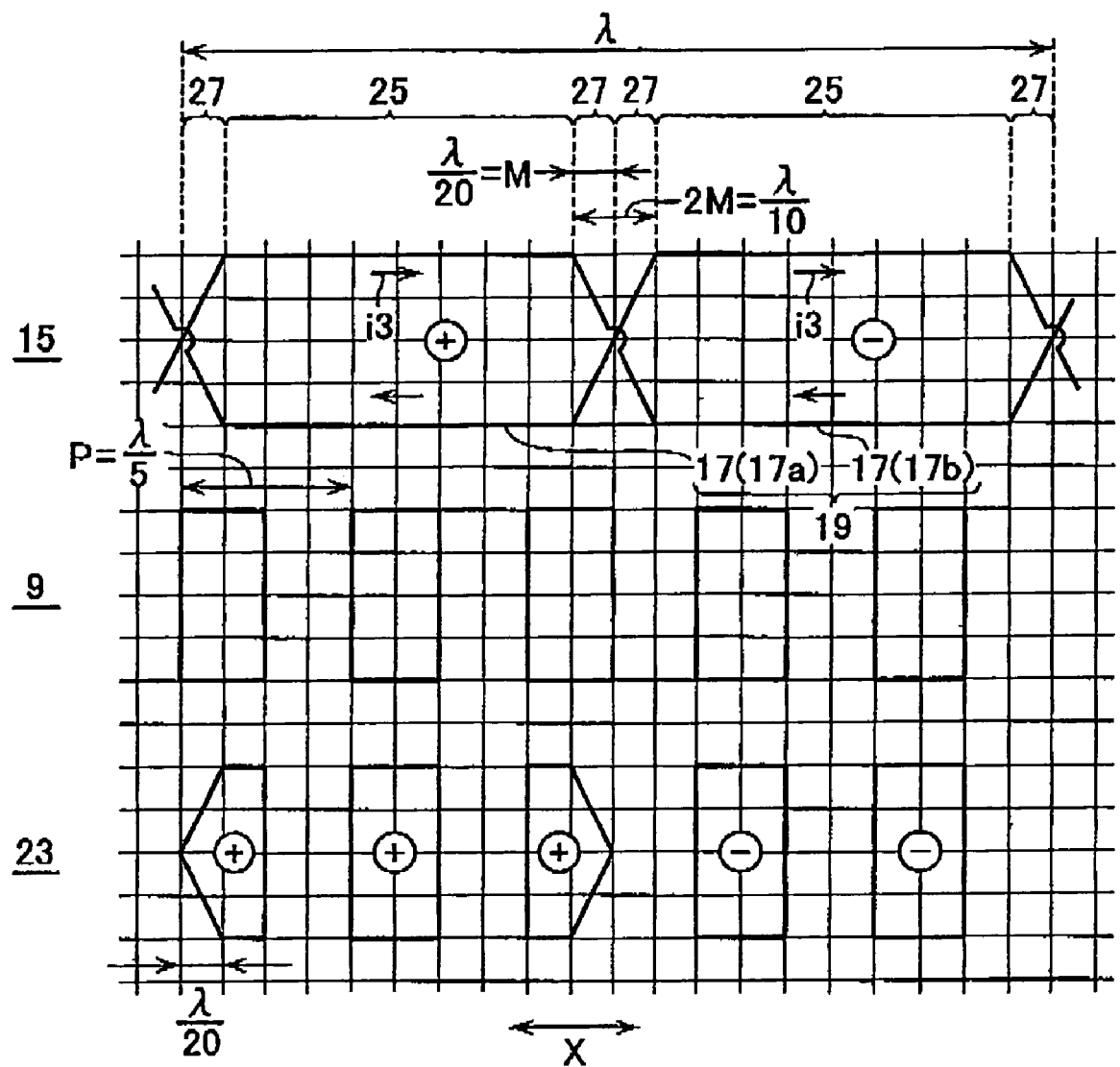
FIG. 7 shows flux coupling windings, a receiving winding and an overlapped portion therebetween according to a second embodiment.

A second embodiment is mainly characterized in that twice the length of the side portion of the receiving loop is made smaller than the pitch between the flux coupling windings. FIG. 7 shows the flux coupling windings 9, the receiving winding 15 and the overlapped portion 23 therebetween according to a second embodiment.

In the second embodiment the receiving loop 17 has a central portion 25 extending along the measurement axis X, and two side portions 27 extending at an angle to the measurement axis X and located on both sides of the central portion 25. Adjacent receiving loops 17a, 17b are linked at the side portions 27 through a three-dimensional intersection.

A symbol M denotes a length of the side portion 27 along the measurement axis X. The length M is equal to $\lambda/20$. Twice the length M, that is, 2M ($=\lambda/10$) is determined smaller than the pitch P ($=\lambda/5$) between the flux coupling windings 9. A primary effect of the second embodiment is described.

Figure 8:
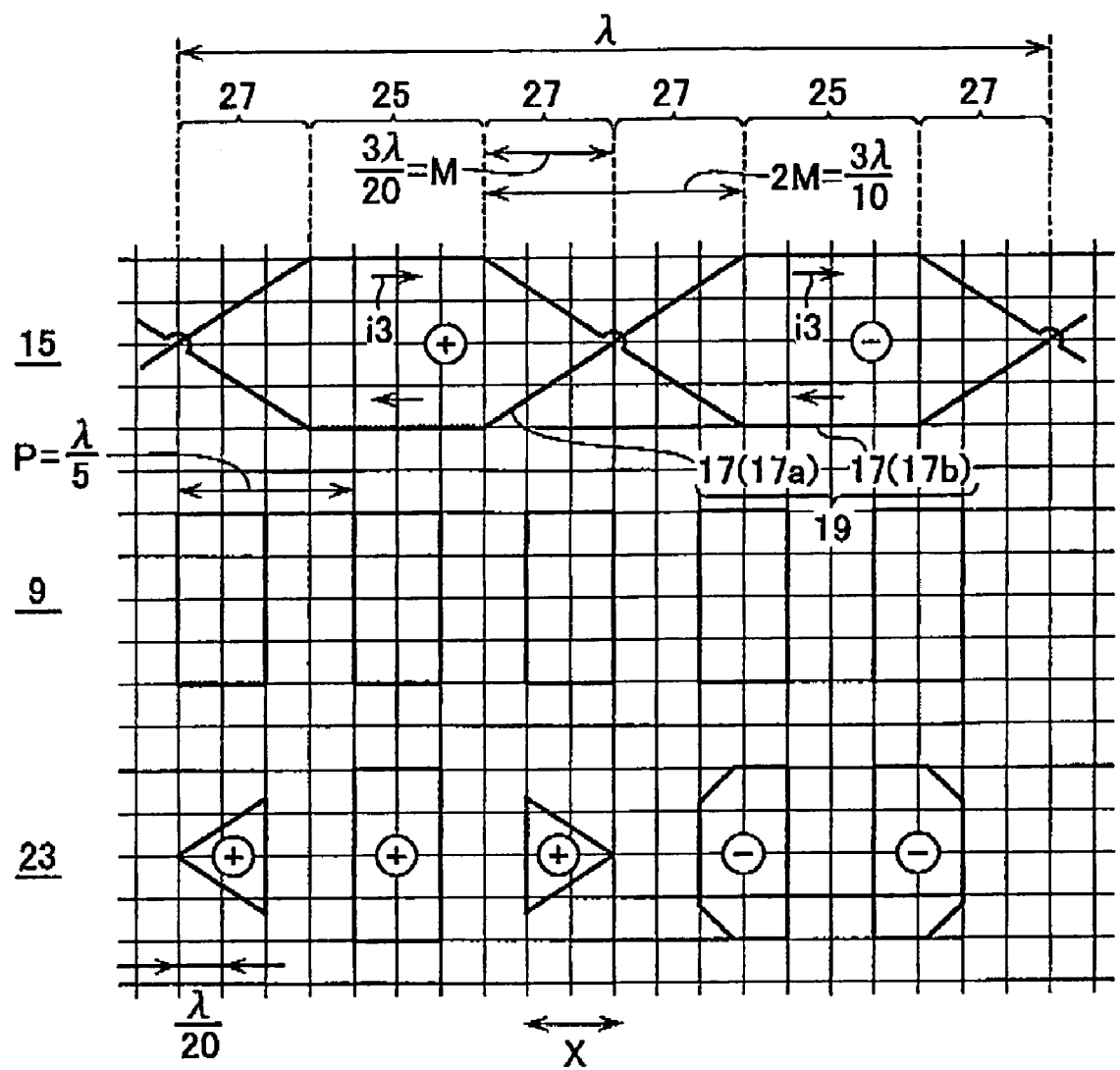
FIG. 8 shows flux coupling windings, a receiving winding and an overlapped portion therebetween according to a comparative example to the second embodiment.

FIG. 8 shows flux coupling windings 9, a receiving winding 15 and an overlapped portion 23 therebetween according to a comparative example to the second embodiment, corresponding to FIG. 7. The side portion 27 of the comparative example has a length M of $3\lambda/20$. Therefore, different from the second embodiment, in the comparative example, 2M ($=3\lambda/10$) is larger than the pitch P ($=\lambda/5$) between the flux coupling windings 9.

In the second embodiment shown in FIG. 7 the area of the "+" overlapped portion 23 is equal to 20 squares while the area of the "−" overlapped portion 23 is equal to 16 squares. On the other hand, in the comparative example shown in FIG. 8 the area of the "+" overlapped portion 23 is equal to about 13 squares while the area of the "−" overlapped portion 23 is equal to about 14 squares.

Therefore, in comparison with the comparative example, the second embodiment has a larger difference between the area of the "+" overlapped portion 23 and the area of the "−" overlapped portion 23 and accordingly enhances the intensity of the output signal from the receiving winding 15.

As the length M of the side portion 27 decreases (in other words, the tilt of the side portion 27 to the measurement axis X increases) in this way, the difference between the area of the "+" overlapped portion 23 and the area of the "−" overlapped portion 23 grows. As a result, the intensity of the output signal is enhanced.

Figure 9:
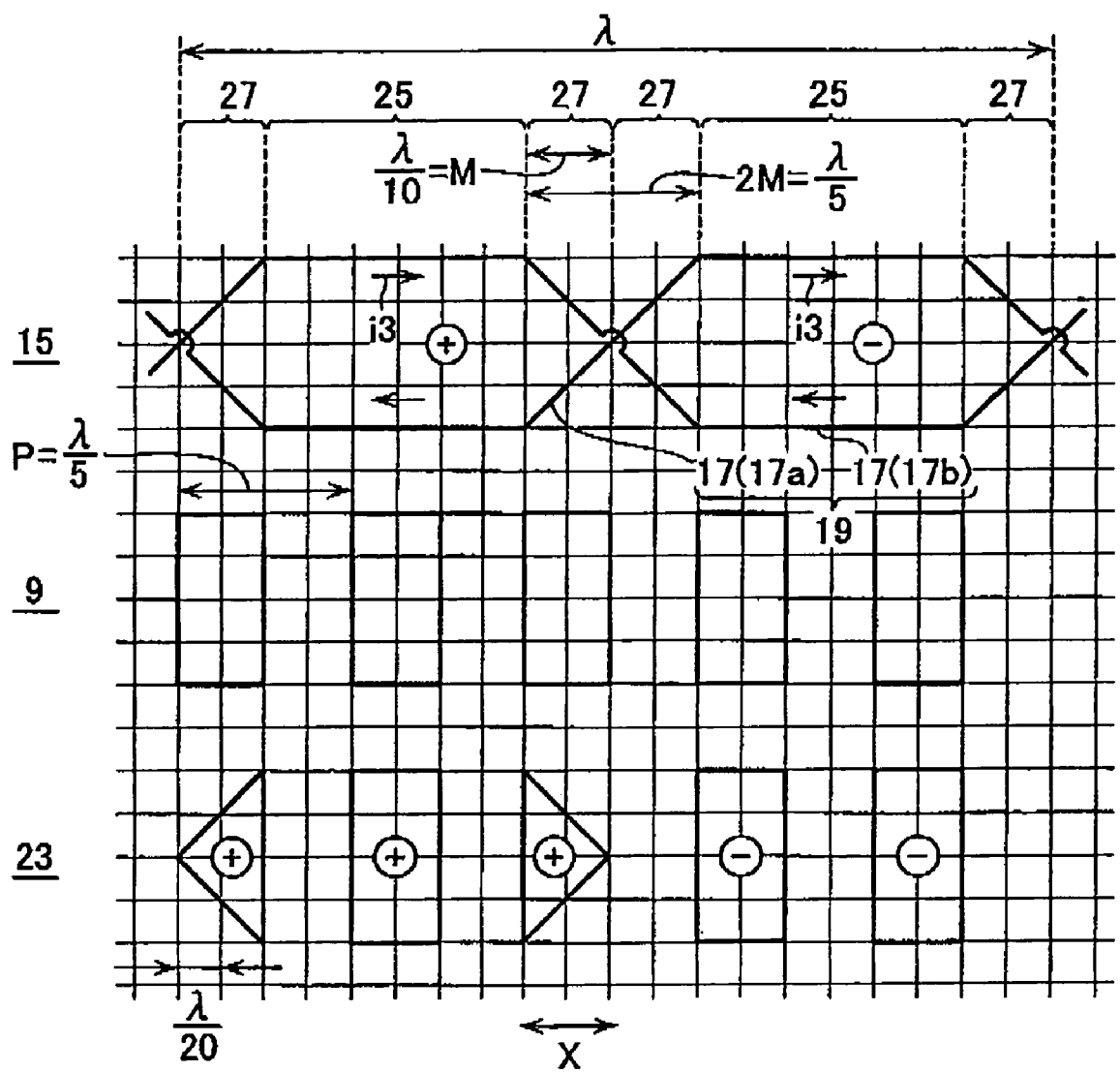
FIG. 9 shows flux coupling windings, a receiving winding and an overlapped portion therebetween according to another comparative example to the second embodiment.

If the pitch P between the flux coupling windings 9 is equal to 2M, no output signal can be obtained because the area of the "+" overlapped portion 23 and the area of the "−" overlapped portion 23 have no difference therebetween as shown in another comparative example of FIG. 9.

As described above, making twice the length M of the side portion 27 along the measurement axis X smaller than the pitch P between the flux coupling members 9 enhances the intensity of the output signal. The second embodiment is also possible from this viewpoint to provide the induction type displacement detector with an improved resolution and high precision. If the length M of the side portion 27 is made excessively smaller (in other words, the tilt of the side portion 27 to the measurement axis X is made excessively larger), the output signal has a large waveform distortion. Accordingly, the waveform of the output signal goes away from an ideal waveform or a sin wave. The intensity of the output signal and the distortion of the output signal are related in a tradeoff. Therefore, the length M of the side portion 27 should be determined in consideration of the tradeoff.

[Third Embodiment]

A third embodiment is mainly characterized in that three receiving windings are arranged with a phase difference of $\lambda/6$ while the flux coupling windings are determined to have a pitch of $\lambda/5$. The third embodiment is directed to the three-phase type that provides differently phase-shifted output signals from three receiving windings. In the third embodiment, the flux coupling windings are same as those of the preceding embodiments and omitted from the following description, and three receiving windings are described.

Figure 10:
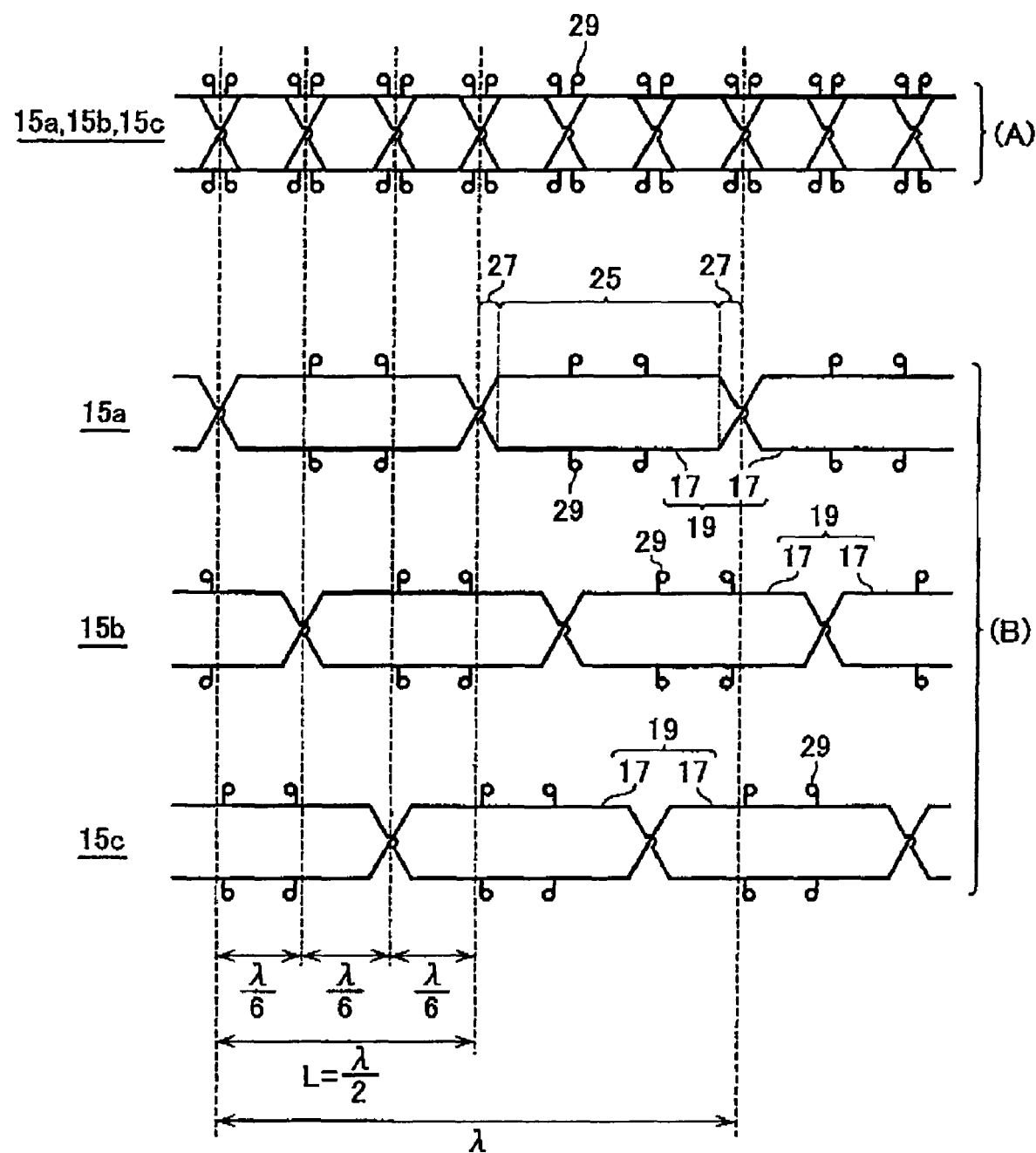
FIG. 10 is an illustrative view of three receiving windings according to a third embodiment.

FIG. 10 is an illustrative view of three receiving windings 15a, 15b, 15c according to the third embodiment. As shown in FIG. 10(A), the receiving windings 15a, 15b, 15c are arranged on the sensor head 5, insulated from each other and overlapped. The reference numeral 29 denotes a contact, which is described later. The receiving windings are shown in FIG. 10(B). With reference to the phase (0°) of the receiving winding 15a, the receiving winding 15b has a difference of $\lambda/6$ phase (60° phase) from the receiving winding 15a. The receiving winding 15c has a difference of $\lambda/3$ phase (120° phase) from the receiving winding 15a.

The three-phase type requires signals with a spatial phase difference of $\lambda/3$. In the third embodiment the receiving windings are arranged with a phase difference of $\lambda/6$. Therefore, with reference to the phase (0°) of the signal received at the receiving winding 15a, the receiving winding 15b receives a $\lambda/6$ phase-shifted signal and the receiving winding 15c receives a $\lambda/3$ phase-shifted signal. In this state, a $2\lambda/3$ phase-shifted signal can not be obtained. When the polarity is inverted, the $\lambda/6$ phase-shifted signal is turned into the $2\lambda/3$ phase-shifted signal. Therefore, in the third embodiment a signal inverter is provided to invert the polarity of the signal received at the receiving winding 15b to provide the $2\lambda/3$ phase-shifted signal.

If a signal offset causes a problem on the arrangement of the receiving windings 15a, 15b, 15c shown in FIG. 10, it is advantageous to arrange the receiving windings with a phase difference of $\lambda/3$. Specifically, the receiving winding 15b is arranged with a phase difference of $2\lambda/3$ from the receiving winding 15a.

Figure 11:
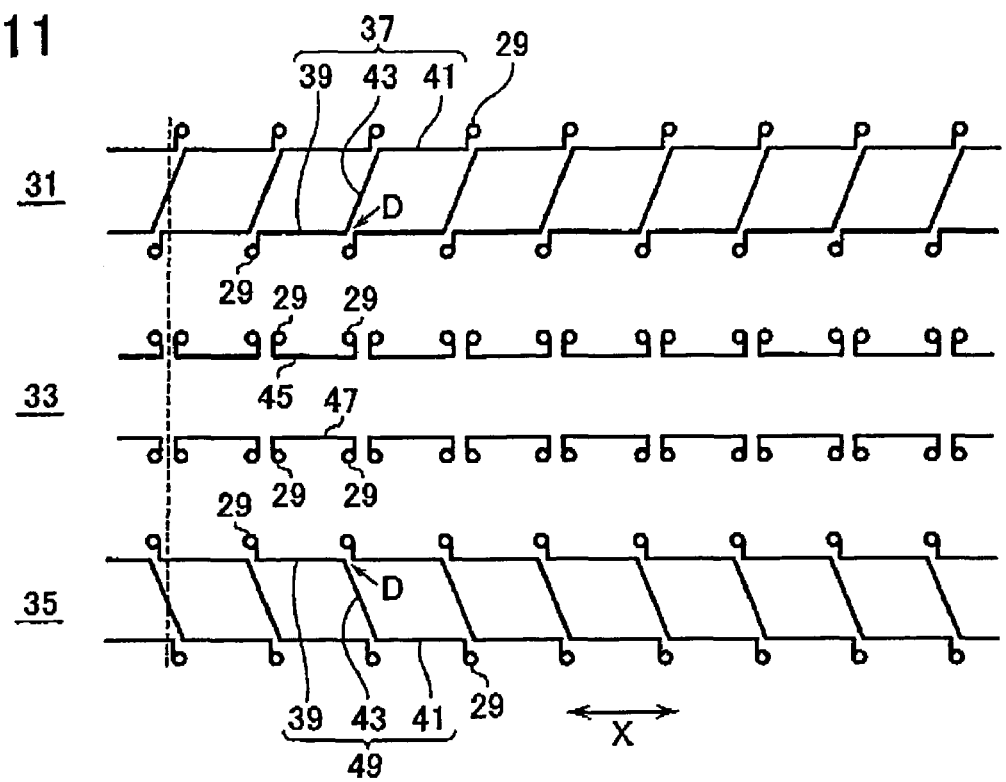
FIG. 11 is a plan view of the three receiving windings shown in FIG. 10 (A), which are decomposed into a first layered wire, a second layered wire and a third layered wire.

FIG. 11 is a plan view of the three receiving windings 15a, 15b, 15c shown in FIG. 10 (A), which are decomposed into a first layered wire 31, a second layered wire 33 and a third layered wire 35. The first layered wire 31 is structured such that a pattern 37 is arranged repeatedly along the measurement axis X. The pattern 37 includes parallel portions 39, 41 paralleled with the measurement axis X and a tilt portion 43 tilted to the measurement axis X. The parallel portions 39, 41 are not opposed to each other but arranged on locations shifted along the measurement axis X and linked via the tilt portion 43. The pattern 37 has both ends serving as contacts 29, which are led out to outside the receiving winding.

The second layered wire 33 includes patterns 45, 47 paralleled with the measurement axis X and opposed to each other. These patterns have contacts 29 at both ends, which are led out to outside the receiving winding. The patterns 45, 47 are arranged repeatedly along the measurement axis X.

The third layered wire 35 is structured such that a symmetric pattern 49 of the pattern 37 is arranged repeatedly along the measurement axis X.

Figure 12:
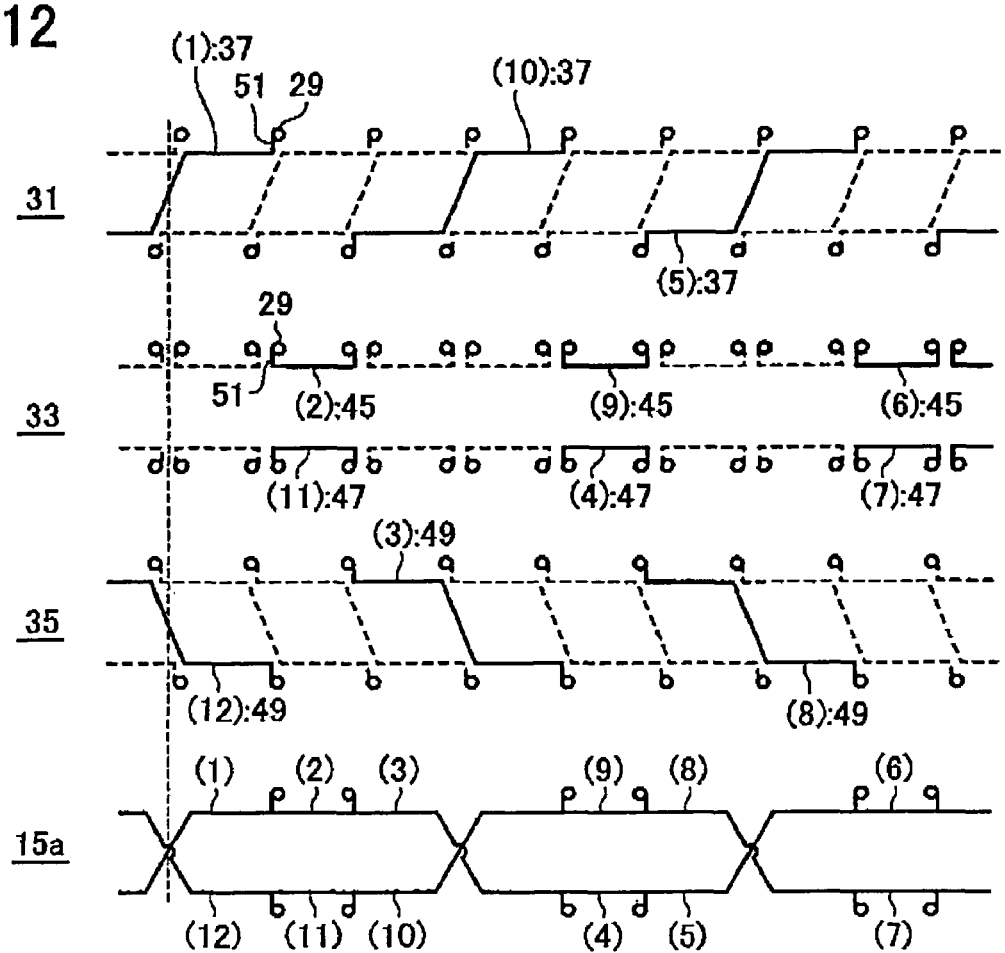
FIG. 12 shows patterns configuring one of the three receiving windings in the third embodiment.

These wires are connected with each other to configure the receiving windings 15a, 15b, 15c shown in FIG. 10 (A). For example, the receiving winding 15a can be described as shown in FIG. 12. Connecting patterns (1)–(6) and connecting patterns (7)–(12) configure the receiving winding 15a.

The contacts 29 are led out to outside the receiving windings 31, 33 and 35 but prevented from causing crosstalk. This is described with reference to the patterns (1) and (2) of FIG. 12. The contacts 29 are connected to the patterns (1) and (2) via respective leads 51 extending from the receiving winding to external. The leads 51 of the patterns (1) and (2) overlap and signals flow therein in opposite directions such that the magnetic fields generated at the leads 51 cancel each other out. Accordingly, it is possible to prevent the leads 51 from causing crosstalk.

Figure 13:
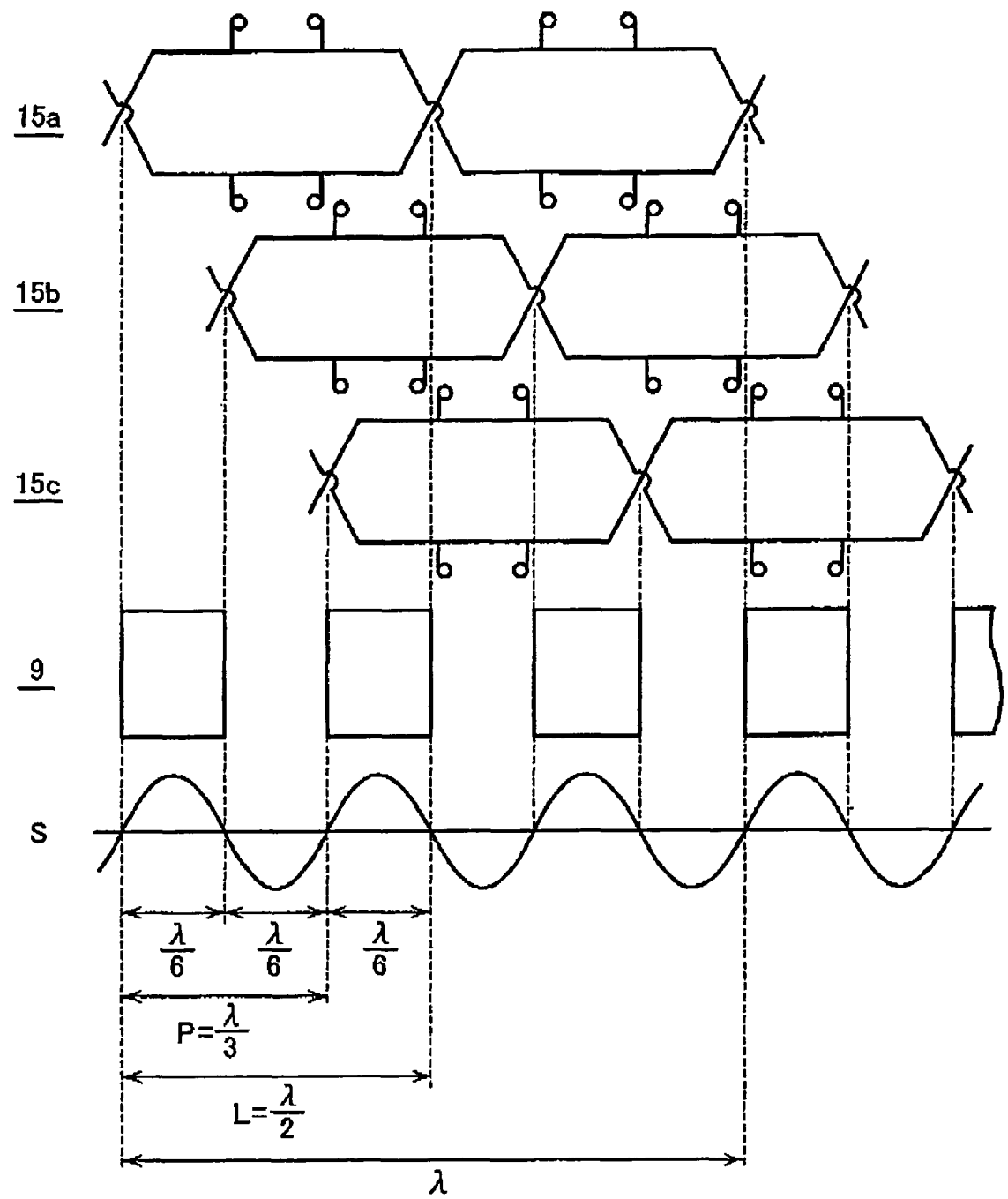
FIG. 13 is an illustrative view of operation of an induction type displacement detector of a comparative example to the third embodiment.

The following description is given to the reason why the pitch between the flux coupling windings is determined to $\lambda/5$. FIG. 13 is a plan view showing part of the receiving windings 15a, 15b, 15c and the flux coupling windings 9 when the pitch P between the flux coupling windings 9 is equal to $\lambda/3$. In order to provide three phase-shifted output signals from the receiving windings 15a, 15b, 15c, these receiving windings are arranged with a phase difference of $\lambda/6$. If the pitch P between the flux coupling windings 9 is determined to $\lambda/3$, the output signals S from the receiving windings 15a, 15b, 15c have the same phase. In this case, three phase-shifted output signals can not be provided from the three receiving windings. Therefore, the pitch P of $\lambda/3$ is excluded.

On the other hand, the smaller the pitch P between the flux coupling windings 9 becomes, the lower the intensities of the output signals from the receiving windings 15a, 15b, 15c become. Therefore, the pitch P between the flux coupling windings 9 is determined to $\lambda/5$.

The third embodiment is described of the three-phase type.

In the two-phase type, with reference to the phase of the first receiving winding, the second receiving winding is $\lambda/4$ phase-shifted from the first receiving winding. In the four-phase type, in addition to the receiving winding of the two-phase type, the third receiving winding is $\lambda/2$ phase-shifted from the first receiving winding, and the fourth receiving winding is $3\lambda/4$ phase-shifted from the first receiving winding. In the two-phase and four-phase types, the pitch between the flux coupling windings may be either $\lambda/5$ or $\lambda/3$.

[Fourth Embodiment]

Figure 14:
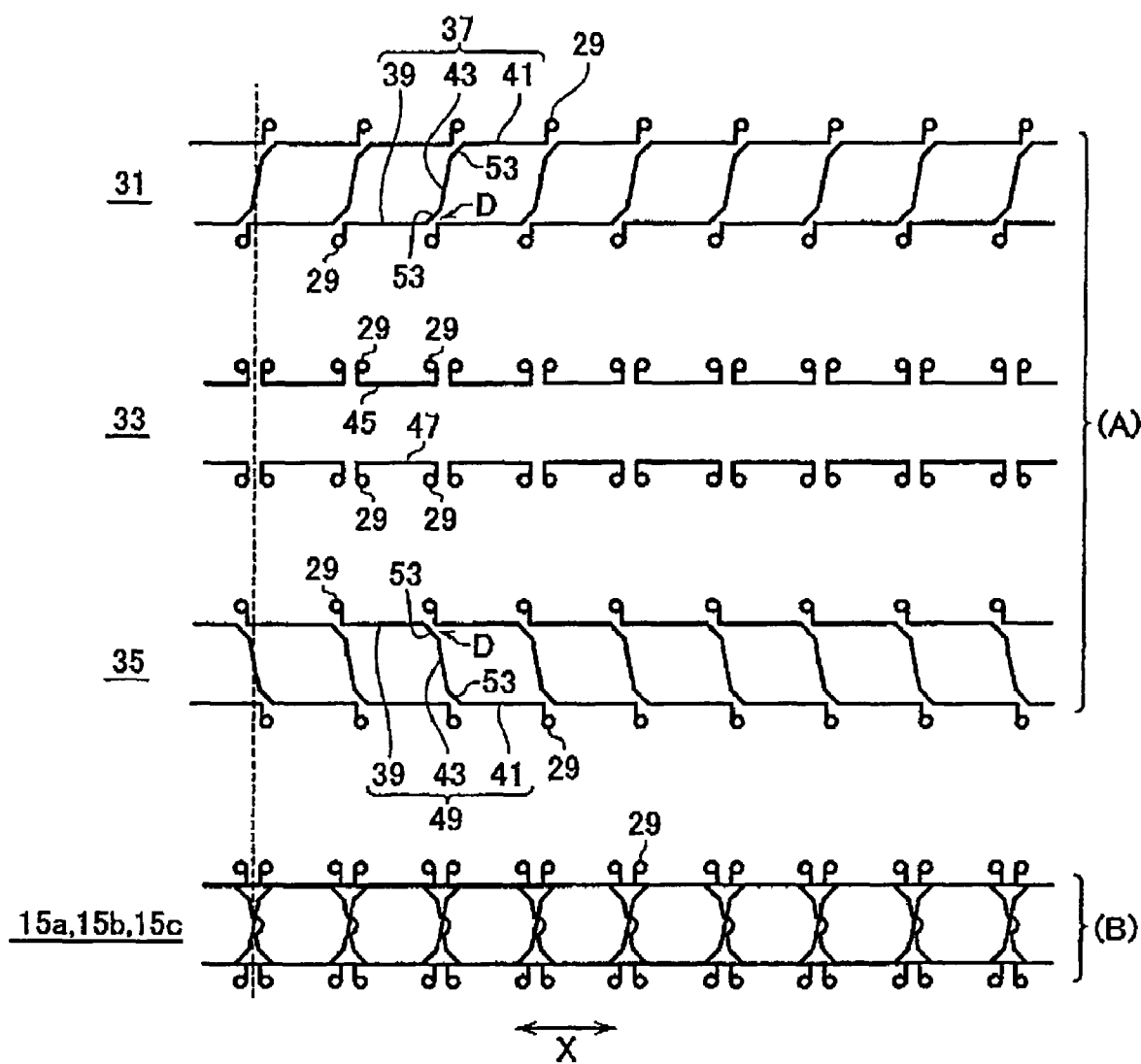
FIG. 14 is an illustrative view of three receiving windings according to a fourth embodiment.

A fourth embodiment is mainly characterized in that a boundary between the central portion and the side portion of the receiving loop is formed smaller in tilt than the side portion. FIG. 14 is an illustrative view of three receiving windings according to the fourth embodiment. The three receiving windings are decomposed into a first layered wire 31, a second layered wire 33 and a third layered wire 35 as shown in a plan view of FIG. 14(A) corresponding to FIG. 11.

The tilt portion 43 has both ends 53 tilted smaller to the measurement axis X. The wires 31, 33, 35 are overlapped to configure the three receiving windings 15a, 15b, 15c as shown in FIG. 14(B), which corresponds to FIG. 10(A).

Figure 15:
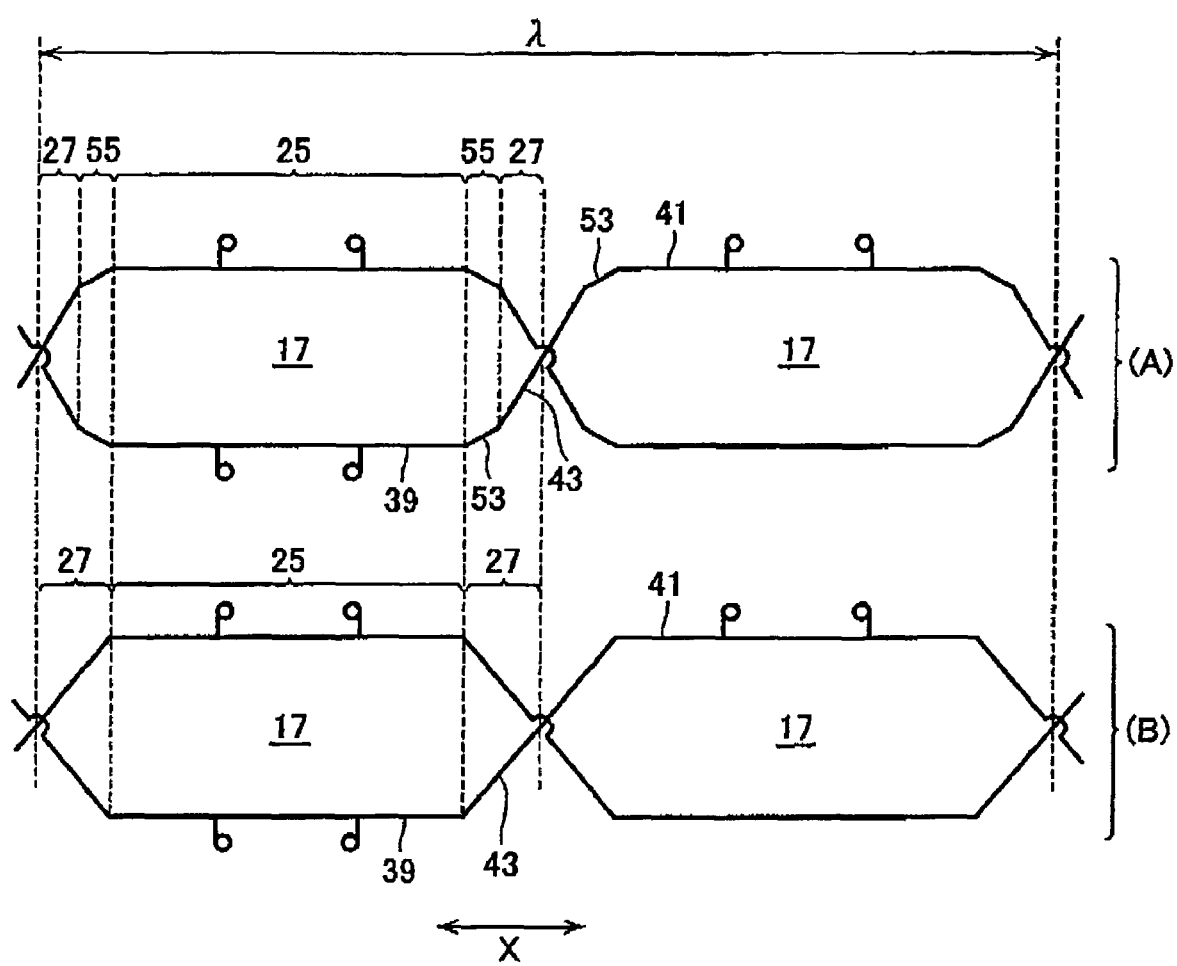
FIG. 15 compares a pair-loop of the third embodiment with that of the fourth embodiment.

An effect of the fourth embodiment is described with reference to FIGS. 11, 14 and 15. FIG. 15 compares a pair-loop of the third embodiment with that of the fourth embodiment and shows (A) the pair-loop of the fourth embodiment and (B) the pair-loop of the third embodiment. In the receiving loop 17 contained in the pair-loop of the fourth embodiment, a boundary 55 between the central portion 35 and the side portion 27 is formed smaller in tilt to the measurement axis X than the side portion 27. The boundary 55 corresponds to both ends 53 of the tilt portion 43.

The larger the side portion 27 tilts, the more the area of the receiving loop 17 overlapping the flux coupling winding increases and the larger the intensity of the output signal enhances by the extent. If the side portion 27 is tilted larger, however, in the third embodiment a distance D between adjacent patterns 37 or a distance D between adjacent patterns 49 is shortened so as to interfere with the design rule as shown in FIG. 11.

In the fourth embodiment of FIG. 14, the tilt of both ends 53 of the tilt portion 43, or the tilt of the boundary 55, is therefore made smaller. As a result, the distance D between adjacent patterns 37 or the distance D between adjacent patterns 49 can be ensured. In addition, the area of the receiving loop overlapping the flux coupling winding (that is, the intensity of the output signal from the receiving winding) can be made larger compared to the third embodiment.

In the fourth embodiment the tilt of the boundary 55 is made smaller than the tilt of the side portion 27 to reduce the waveform distortion of the output signal from the receiving winding. This is effective to approximate the waveform of the output signal to an ideal waveform or a sin wave.

[Fifth Embodiment]

Figure 16:
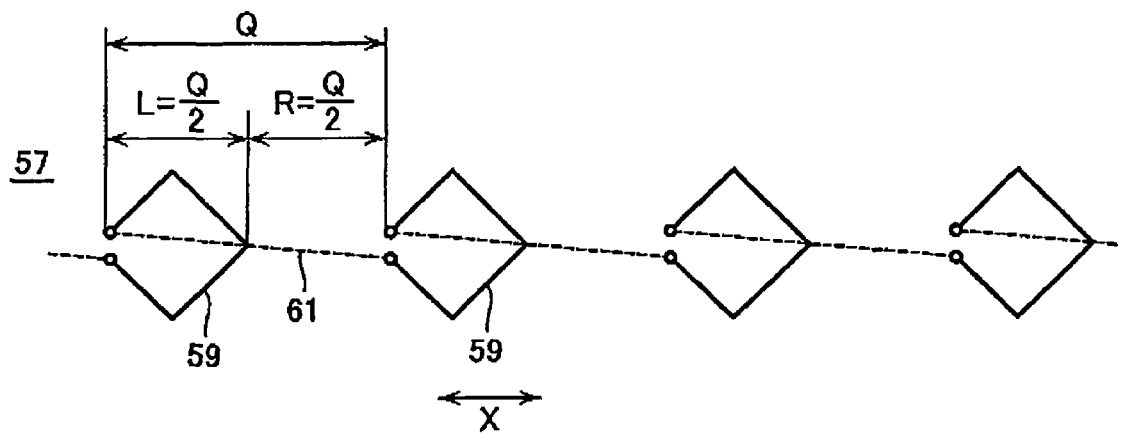
FIG. 16 is a plan view of a receiving winding according to a fourth embodiment.

FIG. 16 is a plan view of a receiving winding 57 of an induction type displacement detector according to a fifth embodiment. In the induction type displacement detectors according to the preceding embodiments the receiving loops comprise pair-loops while in the fifth embodiment a space is provided in between adjacent receiving loops 59. Other parts than the receiving winding 57 are similar to those in the preceding embodiments. The fifth embodiment will be described below in detail.

When the receiving loops 59 have a pitch of Q, the receiving loops 59 have a length L of Q/2 and adjacent receiving loops 59 have a space R of Q/2 therebetween. The receiving loops 59 have a diamond shape. Adjacent receiving loops 59 are connected through a wire 61 located in a lower layer beneath the receiving loops 59. The space between adjacent receiving loops 59 is a space corresponding to one receiving loop 59. This space is not limited in dimension.

Figure 17:
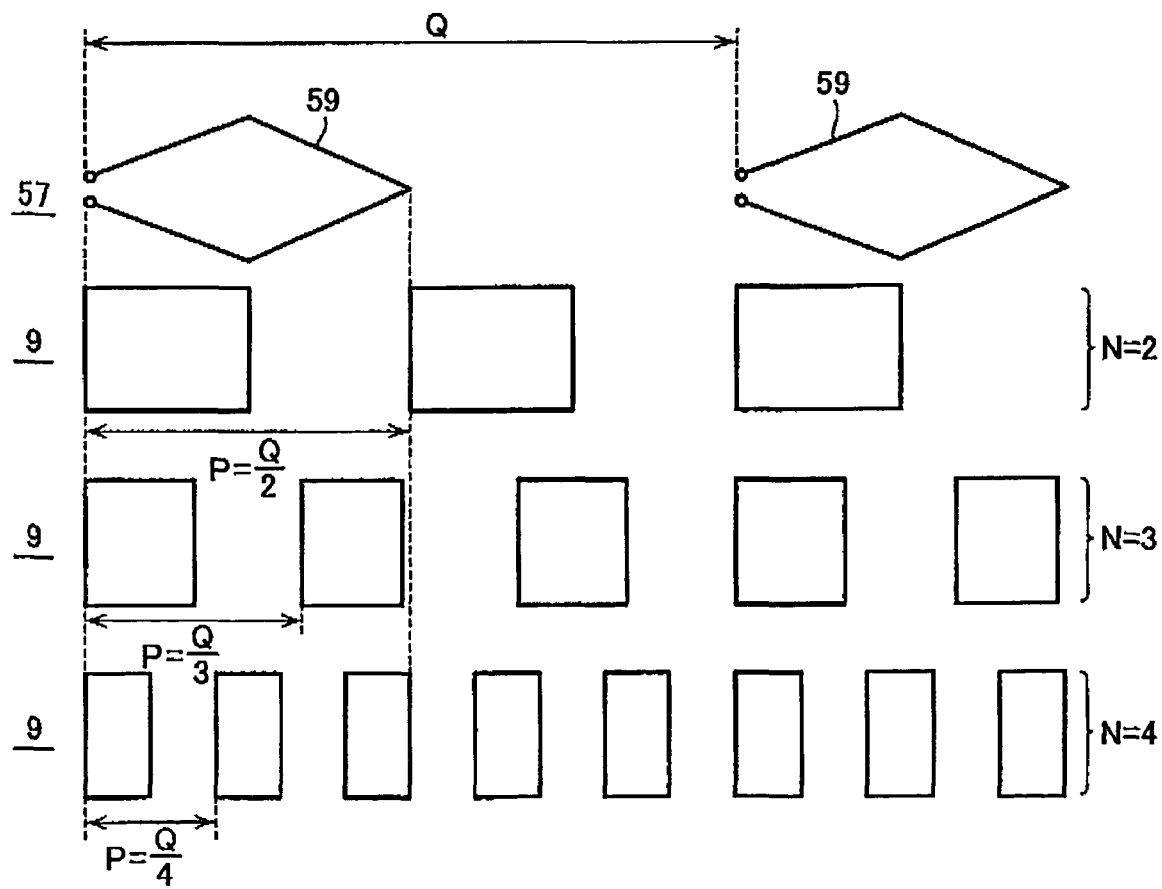
FIG. 17 shows flux coupling windings and the receiving winding according to the fifth embodiment.

In the fifth embodiment the flux coupling windings have a pitch P of Q/N (N is an integer of 2 or more) as described with reference to FIG. 17. FIG. 17 shows flux coupling windings 9 and the receiving winding 57 according to the fifth embodiment where N is equal to 2, 3, 4. In the fifth embodiment a space of one receiving loop 59 is provided in between adjacent receiving loops 59. Accordingly, the induced currents flowing in the receiving loops 59 can not cancel each other out like in the pair-loop. Therefore, N may be either even or odd.

In the fifth embodiment, relative to the pitch Q between the receiving loops 59, the pitch P between the flux coupling windings 9 is determined to Q/N (N is an integer of 2 or more). Accordingly, for the same reason as in the first embodiment, it is possible to provide the induction type displacement detector with an improved resolution and high precision and lower the production cost of the induction type displacement detector.

The three-phase type is also applicable to the fifth embodiment. Three receiving windings may be arranged with a phase difference of $\lambda/6$ or arranged with a phase difference of $\lambda/3$ as described in the third embodiment. From the viewpoint of elimination of the influence from the signal offset, it is effective to arrange three receiving windings with a phase difference of $\lambda/3$.

What is claimed is:

1. An induction type displacement detector, comprising:
   a scale;
   a sensor head arranged opposite to said scale and movable relative to said scale in a direction along a measurement axis;
   a transmitting member arranged on said sensor head;
   a receiving winding having a plurality of receiving loops arrayed on said sensor head along said measurement axis; and
   a plurality of flux coupling members capable of flux coupling to said transmitting member and said receiving winding and arrayed on said scale along said measurement axis,
   wherein adjacent receiving loops configure a pair-loop having a length of $\lambda$ along said measurement axis,
   wherein each receiving loop has a length of $\lambda/2$ along said measurement axis, and said flux coupling members have a pitch of $\lambda/N$, where N is an odd number of 3 or more.

2. The induction type displacement detector according to claim 1, wherein said receiving winding is one of three such receiving windings arranged with a phase difference of $\lambda/3$ or $\lambda/6$, and
   wherein said flux coupling members have a pitch of $\lambda/5$.

3. The induction type displacement detector according to claim 1, wherein said receiving winding is one of two or four such receiving windings arranged with a phase difference of $\lambda/4$.

4. The induction type displacement detector according to claim 1, wherein said flux coupling members are covered in a passivation film on said scale.

5. The induction type displacement detector according to claim 1, wherein said transmitting member is formed in a rectangle with the longitudinal direction arranged along said measurement axis.

6. The induction type displacement detector according to claim 1, wherein adjacent receiving loops configure a pair-loop linked through a three-dimensional intersection.

7. The induction type displacement detector according to claim 1, wherein said receiving loops each have a central portion extending along said measurement axis, and two side portions extending at an angle to said measurement axis and located on both sides of said central portion, and
   wherein twice the length of said side portion along said measurement axis is smaller than a pitch between said flux coupling members.

8. The induction type displacement detector according to claim 7, wherein a boundary between said central portion and said side portion is formed smaller in tilt to said measurement axis than said side portion.

9. An induction type displacement detector, comprising:
   a scale;
   a sensor head arranged opposite to said scale and movable relative to said scale in a direction along a measurement axis;
   a transmitting member arranged on said sensor head;
   a receiving winding having a plurality of receiving loops arrayed on said sensor head along said measurement axis such that a space is provided in between adjacent receiving loops; and
   a plurality of flux coupling members capable of flux coupling to said transmitting member and said receiving winding and arrayed on said scale along said measurement axis,
   wherein said receiving loops have a pitch of Q, and said flux coupling members have a pitch of Q/N where N is an integer of 2 or more.

* * * * *

UNITED STATES PATENT AND TRADEMARK OFFICE
CERTIFICATE OF CORRECTION

PATENT NO.       : 7,196,510 B2  
APPLICATION NO.  : 11/248513  
DATED            : March 27, 2007  
INVENTOR(S)      : Kawatoko It is certified that error appears in the above-identified patent and that said Letters Patent is hereby corrected as shown below:

Column 12, Line 39, (Claim 9, Line 16), after "Q/N", insert --,-- (comma).

Signed and Sealed this

Eighth Day of May, 2007

JON W. DUDAS  
*Director of the United States Patent and Trademark Office*